(12) United States Patent
Anno et al.

(10) Patent No.: US 9,123,134 B2
(45) Date of Patent: Sep. 1, 2015

(54) METHOD FOR TRACKING AND FORECASTING MARINE ICE BODIES

(71) Applicant: CONOCOPHILLIPS COMPANY, Houston, TX (US)

(72) Inventors: Phil D. Anno, Houston, TX (US); Khalid A. Soofi, Katy, TX (US)

(73) Assignee: ConocoPhillips Company, Houston, TX (US)

( * ) Notice: Subject to any disclaimer, the term of this patent is extended or adjusted under 35 U.S.C. 154(b) by 32 days.

(21) Appl. No.: 14/196,607

(22) Filed: Mar. 4, 2014

(65) Prior Publication Data

US 2014/0341423 A1    Nov. 20, 2014

Related U.S. Application Data

(60) Provisional application No. 61/780,386, filed on Mar. 13, 2013.

(51) Int. Cl.
| | |
|---|---|
| *G06K 9/00* | (2006.01) |
| *G06T 7/20* | (2006.01) |
| *B63B 35/08* | (2006.01) |
| *G01W 1/00* | (2006.01) |
| *G01S 13/90* | (2006.01) |
| *G06T 7/00* | (2006.01) |

(52) U.S. Cl.
CPC .................. *G06T 7/204* (2013.01); *B63B 35/08* (2013.01); *G01S 13/90* (2013.01); *G01W 1/00* (2013.01); *G06T 7/0042* (2013.01); *G06T 7/0051* (2013.01); *G06T 2207/10044* (2013.01); *G06T 2207/20036* (2013.01); *G06T 2207/30181* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 2002/0168091 A1* | 11/2002 | Trajkovic ...................... | 382/107 |
| 2007/0221743 A1* | 9/2007 | Weinzapfel et al. .......... | 239/14.1 |
| 2011/0291862 A1* | 12/2011 | Broman et al. ................ | 340/984 |
| 2012/0226470 A1* | 9/2012 | Seymour ....................... | 702/150 |
| 2012/0316769 A1* | 12/2012 | Gagliardi et al. ............. | 701/300 |
| 2014/0313072 A1* | 10/2014 | Soofi et al. ................... | 342/25 A |

OTHER PUBLICATIONS

Anno, P., Soofi, K., Cobb, B., Santosuosso, J., Yetsko, C., and Glover, D., 2012, Near-Real-Time Tracking and Integrated Forecasting of Arctic Ice Floes: Proceedings of the Arctic Technology Conference, Dec. 3-5, 2012, Houston, Texas, OTC 23839.*
International Search Report (PCT Rule 44.1). PCT/US2014/020502 Dated Jun. 6, 2014.
King 2012 Thesis Paper. Sea ice tracking from SAR in the Arctic. University of Sheffield.
Blunt, J., Kumaran, K., Garras Yanni, V., Matskevitch, D., Hamilton, J., 2012, Image Analysis Techniques for High Arctic, Deepwater Operation Support: Proceedings of the Arctic Technology Conference, Dec. 3-5, 2012, Houston, Texas, OTC 23825.

(Continued)

*Primary Examiner* — Utpal Shah
*Assistant Examiner* — Narek Zohrabyan
(74) *Attorney, Agent, or Firm* — ConocoPhillips Company

(57) ABSTRACT

A near-real-time tracking and integrated forecasting of marine ice bodies observable on satellite imagery.

6 Claims, 6 Drawing Sheets

(56) References Cited

OTHER PUBLICATIONS

Blunt, J., Mitchell, D., Matskevitch, D., Younan, A., Hamilton, J., 2012, Tactical Sea Ice Drift Forecasting for Summer Operation Support in the Canadian Beaufort Sea: Proceedings of the Arctic Technology Conference, Dec. 3-5, 2012, Houston, Texas, OTC 23824.

Khandekar, M., 1980, Inertial oscillations in floe motion over the Beaufort Sea—observations and analysis: Atmosphere-Ocean, 18:1, 1-14.

Otsu, N., 1979, A threshold selection method from gray-level histograms: IEEE Transactions on Systems, Man and Cybernetics, vol. 9, No. 1, pp. 62-66.

Sayed, M. and Timco, G., 2009, A numerical model of iceberg scour: Cold Regions Science and Technology, 55, 103-110.

Hall J., Bigg G., and Hall, R., Presentation. "Adapting the ITSARI Algorithm to identify Sea Ice Extent and Movement in the Fram Strait," University of Sheffield, Oct. 12, 2009, 10th Meeting of the International Ice Charting Working Group; Geneva, Switzerland.

Izenman, 2008, "Modern Multivariate Statistical Techniques," (Chapter 6, pp. 159-189), Springer.

Izenman, 2008, "Modern Muitivariate Statistical Techniques," (Chaper 12, pp. 407-462), Springer.

* cited by examiner

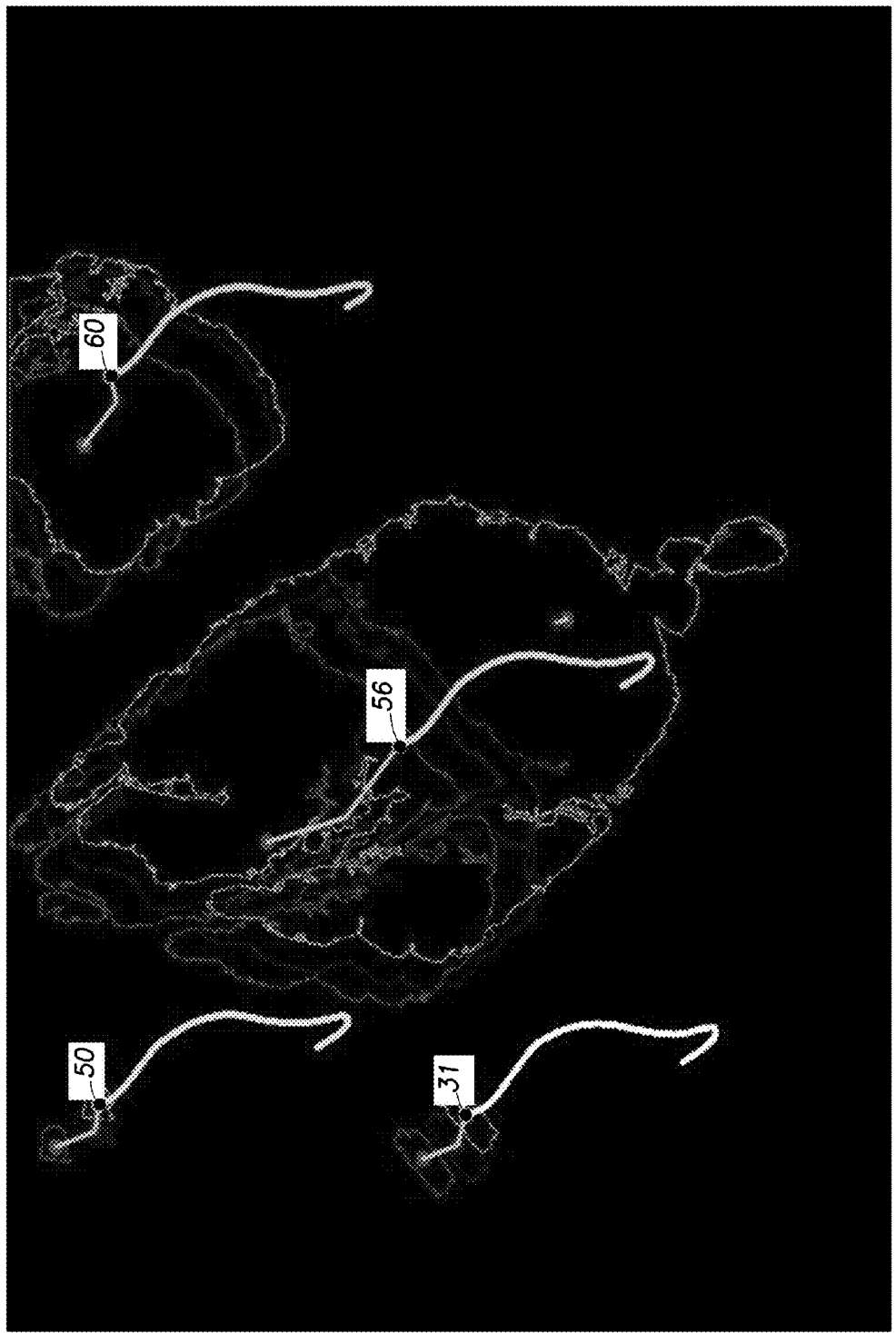

METHOD FOR TRACKING AND FORECASTING MARINE ICE BODIES

This application is a non-provisional application which claims benefit under 35 USC §119(e) of and priority to U.S. Provisional Application Ser. No. 61/780,386 filed 13 Mar. 2013, entitled "METHOD FOR TRACKING AND FORECASTING MARINE ICE BODIES," which is incorporated by reference herein in its entirety.

FIELD OF THE INVENTION

This invention relates to near-real-time tracking and integrated forecasting of marine ice bodies observable on satellite imagery.

BACKGROUND OF THE INVENTION

Oil and gas production operations in new regions, such as the Arctic, have dramatically increased over the past few years. This increasing activity makes it more likely that fixed or floating production platforms, drill ships, and other structures will be used in these regions. A concern for these types of structures in such regions is potential for damage caused by ice bodies that are uncontrolled and floating in the water, such as icebergs, ice floes, and other moving ice bodies. In icy regions, for example, large icebergs and strong ice floes can pass through survey, production, and drilling areas. Although production vessels may be designed to handle some impacts from such marine obstacles, the vessels may have limits on how long impacts can be sustained and what force of potential impacts that can be handled safely.

For these reasons, operators on a production vessel or other structure will need to anticipate these obstacles so the production vessel can be sufficiently protected. If conditions become too dangerous, operators may also need to suspend operations and move the production vessel away until it is safe to return to normal operations. Being able to do so reliably can be of utmost importance to operators.

Others have developed methods for detecting and characterizing ice floes from satellite imagery (Blunt, Kumaran et al., 2012). Hall et al. (2010) describe a method for tracking ice floes from one image to the next. Blunt, Mitchell et al. (2012) describe a method for forecasting ice floe trajectories with an estimate of uncertainty. However, no solution has been proposed for a near-real-time method for tracking and forecasting the movement of marine ice bodies Therefore, a need exists for a method for tracking and forecasting the movements of marine ice bodies.

SUMMARY OF THE INVENTION

In an embodiment, a method for tracking and forecasting a marine ice body includes: (a) capturing an image and metocean data of an area of interest with a synthetic aperture radar (SAR), wherein the image includes a plurality of pixels; (b) detecting any marine ice bodies in the area of interest with the synthetic aperture radar (SAR); (c) classifying the plurality of pixels in the image to define a shape and position of the marine ice body; (d) repeating steps (a)-(c) at least once to obtain an additional image; (e) comparing sequential images, wherein a background trend for motion between images and a shape characteristic are utilized to compare the sequential images, wherein the background trend is determined by establishing a correlation between the sequential images, wherein an ITSARI algorithm is utilized to determine the shape characteristic of the marine ice body; (f) solving a trajectory of each ice floe beyond its current position, wherein the metocean data is utilized to solve the trajectory for each the marine ice bodies beyond its current position; and (g) updating Gaussian uncertainty parameters with cumulative observations of error from incoming SAR to provide a cone of uncertainty for the forecasted trajectory.

In another embodiment, a method for tracking and forecasting a marine ice body includes: (a) capturing an image and metocean data of an area of interest with any type of satellite imagery, wherein the image includes a plurality of pixels; (b) detecting any marine ice bodies in the area of interest with the satellite imagery; (c) classifying the plurality of pixels in the image to define a shape and position of the ice floe; (d) repeating steps (a)-(c) at least once to obtain an additional image; (e) comparing sequential images, wherein a background trend for motion between images and a shape characteristic are utilized to compare the sequential images, wherein the background trend is determined by establishing a correlation between the sequential images, wherein a tracking algorithm is utilized to determine the shape characteristic; (f) solving a trajectory of each marine ice body beyond its current position, wherein the metocean data is utilized to solve the trajectory for each marine ice body beyond its current position; and (g) applying an uncertainty model for uncertainty in the trajectory forecast.

BRIEF DESCRIPTION OF THE DRAWINGS

The invention, together with further advantages thereof, may best be understood by reference to the following description taken in conjunction with the accompanying drawings in which:

FIG. 2A is a schematic depiction of ice floe detection and characterization from SAR over a three-day period, with three-day ice floe trajectory forecasts beyond the latest positions in FIG. 1, in accord with the present invention.

DETAILED DESCRIPTION OF THE INVENTION

Reference will now be made in detail to embodiments of the present invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used in another embodiment to yield a still further embodiment. Thus, it is intended that the present invention cover such modifications and variations that come within the scope of the appended claims and their equivalents.

In order to track and forecast marine ice bodies on a near-real-time basis, the following ongoing operations are performed (1) classifying every pixel (the smallest part of electronically coded picture imagery) in a Synthetic Aperture Radar (SAR) image as it enters the incoming data stream, ultimately defining the shape and position of every ice floe captured by the SAR; (2) comparing sequential SAR images in order to establish the path of ice floes over time; (3) ingesting metocean data streams to solve for the trajectory of each floe beyond its current position; and (4) updating uncertainty parameters adaptively in accordance with cumulative observations from incoming SAR imagery.

Synthetic Aperture Radar (SAR) takes advantage of the long-range propagation characteristics of radar signals and the complex information processing capability of modern digital electronics to provide high resolution imagery. Synthetic aperture radar complements photographic and other optical imaging capabilities because of the minimum constraints on time-of-day and atmospheric conditions and because of the unique responses of terrain and cultural targets to radar frequencies.

Metocean data refers to a combination of meteorological data (wind, atmospheric pressure, air temperature, etc.) and oceanographic data (waves, current, water level, salinity, water temperature, ice, etc.). The two sets of parameters are deeply related as the meteorological conditions are the driving forces for waves, surge levels and current. Measurement programs will typically record both types of data.

Figure 1A:
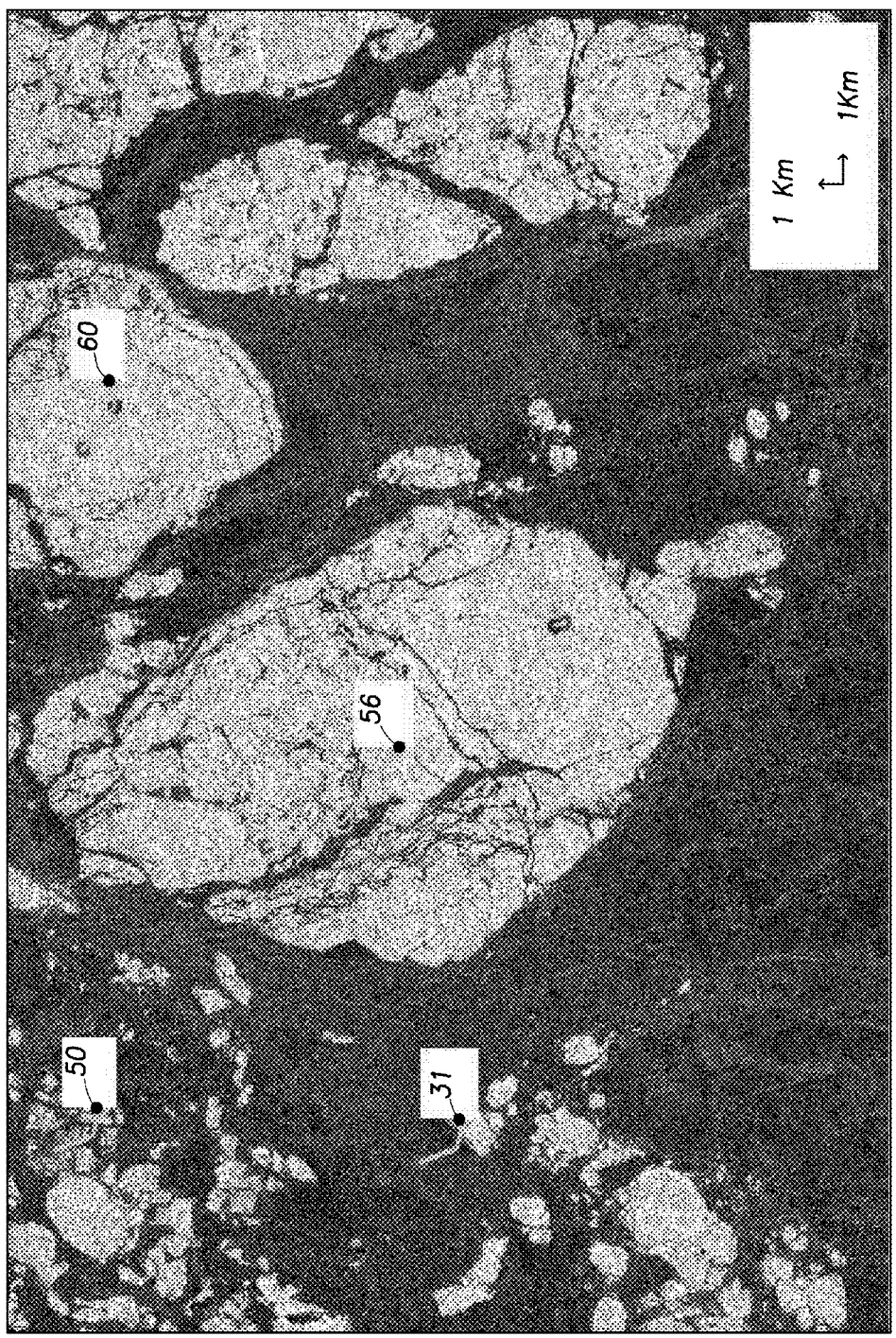
FIG. 1A is a schematic depiction of satellite imagery from synthetic aperture radar (SAR), in accord with the present invention.
Figure 1B:
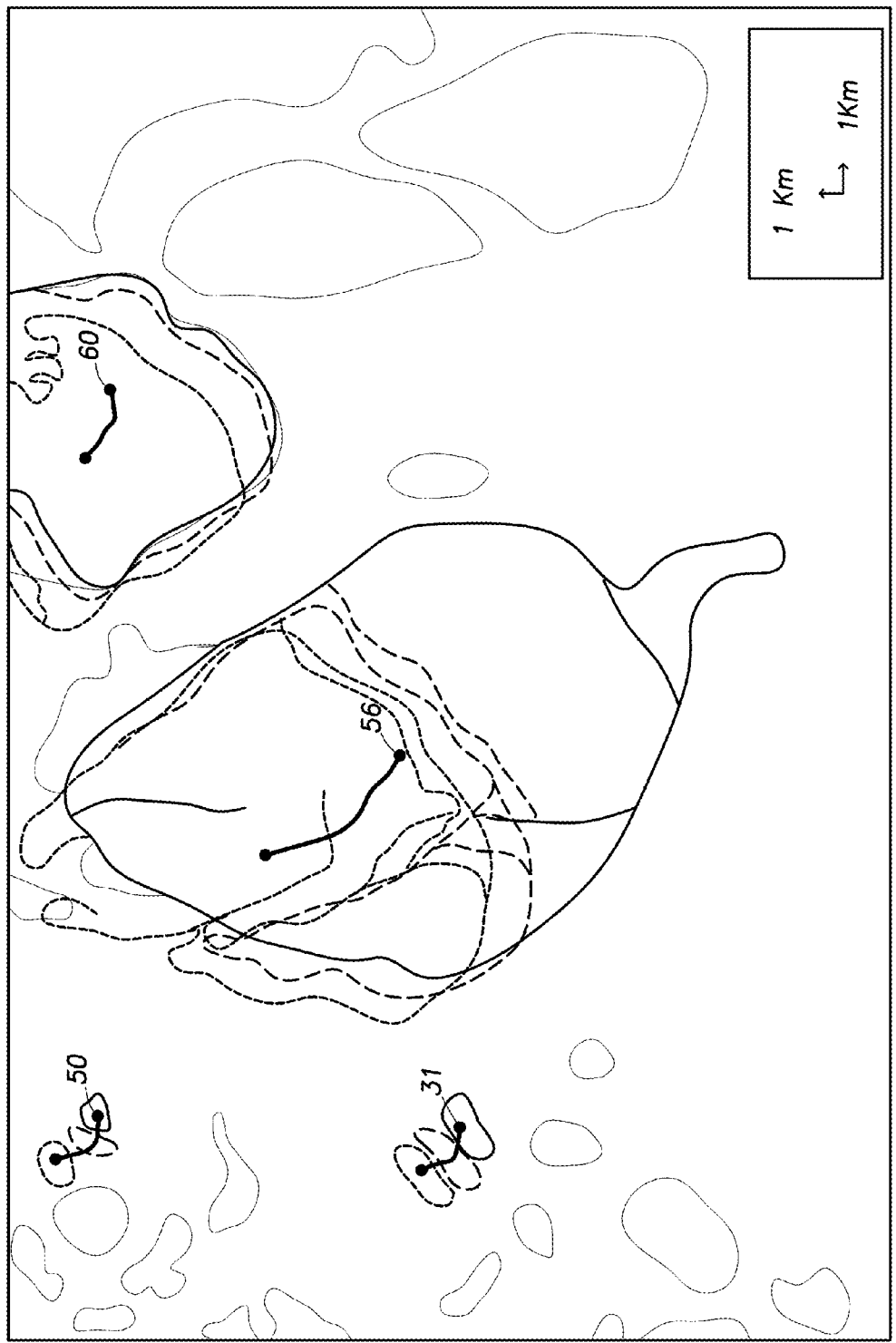
FIG. 1B is a more detailed schematic depiction of FIG. 1A.

FIGS. 1A and 1B depict SAR images of an area of interest containing ice bodies (31, 50, 56, 60). In FIG. 1A, the ice bodies (or ice floes) appear as white objects, with four (out of more than 100) floes of various sizes and shapes numbered and outlined (see FIG. 1B for more detail). The brightness of the image varies with the degree of radar signal backscatter, which in turn depends on the surface roughness and dielectric constant of the scatterer. Generally speaking, ice bodies that persist over multiple years develop a rough surface and generate bright returns on SAR images. The ocean surface and first-year ice pack are comparatively smooth and produce the darker regions in FIG. 1A.

The outlines of the ice body positions in FIGS. 1A and 1B are the result of ice body detection and characterization, and establish the progression of the ice bodies over a three-day period. Various classification algorithms can be applied to the satellite data to classify every pixel in a SAR image as it enters the incoming data stream, ultimately defining the shape and position of every ice body. Typically, ice bodies are first detected in the image through pixel-intensity thresholding algorithms (Otsu, 1979) to identify at least some portion of each of the ice bodies. The most straightforward detection algorithms, applied for FIGS. 1A and 1B, define an ice floe (31, 50, 56, 60) as any object that exceeds a chosen threshold of SAR pixel intensity. Morphological workflows (Bunt, Garas et al., 2012) then segment the clusters of pixels around each identified ice floe to fully define the perimeter and shape of the floe and remove artifacts of no interest between floes.

FIG. 1B also depicts two successive updates of floe positions (first solid line, then dashed line) that preceded the green positions. These preceding positions were tracked from two successive images that entered the SAR data stream, first 48 hours (tightly dashed line) before the image in FIG. 1B, then 24 hours before (dashed line). As depicted, during that two-day interval many of the ice floes moved about 2 km across the area of interest, driven by forces from wind, water currents, the surrounding ice pack, and the Coreolis force from the earth's rotation. The automated algorithms characterize the track of ice floes over time by the progression of their outline (from tightly dashed line to dashed line to solid line) as well as a line connecting their centroid from one image to the next. Floe 56 in FIG. 1B is the result of two floes merging to one due to the closing of an open-water lead in the ice during those two days. The southern portion of this floe was locked in place by ice pack, making the green floe outline (solid line) essentially overlay previous (tightly dashed) and (dashed) positions for that portion of the merged floe.

Ice floe tracking established in FIG. 1B is computed by combining correlation (Izenman, 2008) between successive images with the physical shape-based information that is derived as a result of ice floe detection and characterization performed on each incoming satellite image. Information on ice floe perimeter and shape, centroid location, surface area, etc. is derived via the detection/characterization operators of the morphological workflow each time a new SAR image enters the data stream. Correlation establishes a background trend for motion between images, but does not pair up individual floes. The ITSARI algorithm (Hall et al., 2010) is one method that matches individual ice floes from image to image using shape characteristics alone from the morphological workflow. The trend constraint provided by correlation makes shape-based matching of ice floes from the ITSARI algorithm more robust.

Figure 2B:
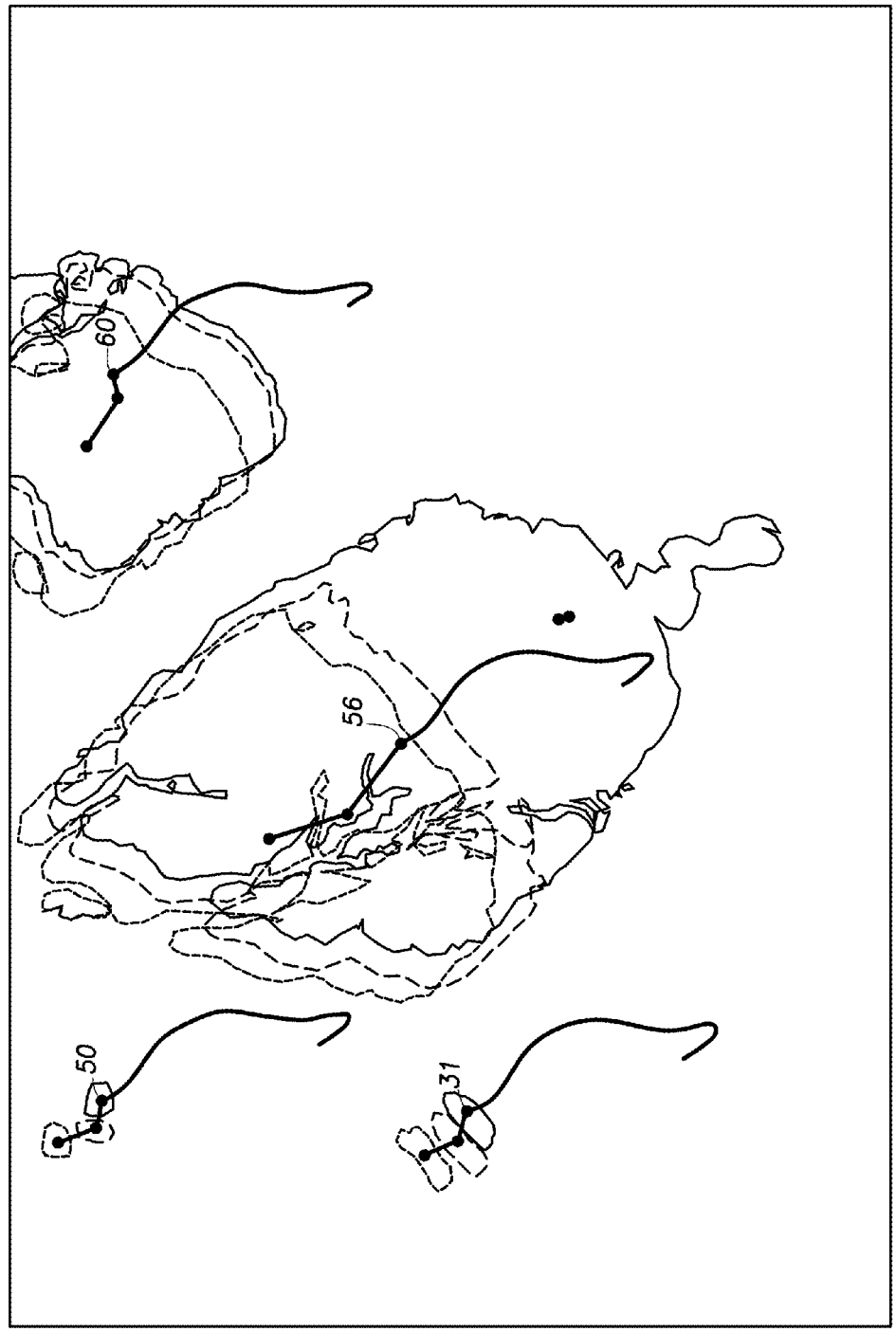
FIG. 2B is a more detailed schematic depiction of FIG. 2A.

As previously discussed, ice management operations around a drilling platform may require advance notice of impending threats ranging from hours up to many days, depending on the depth the well has reached in its drilling program. The trajectory of each ice floe is forecasted out to several days or weeks beyond the last identified position, and before the next SAR image is collected and all positions updated. FIGS. 2A and 2B show three-day forecasts (31, 50, 56, 60), extending the tracks beyond the positions last observed in FIGS. 1A and 1B. These forecasted trajectories satisfy $$m\frac{dv}{dt} = F_p + C_w\rho_w A V_w^2 + C_a\rho_a A V_a^2 + mf\hat{k} \times v \quad (1)$$

$$V_a^2 \equiv |v_a - v|(v_a - v) \quad (2)$$

where v denotes the unknown velocity of the ice flow; $F_p$ couples forces from surrounding ice pack and other ice floes into the motion of the ice flow; $V_a$ captures forces due to air current through measured velocities; $V_w$ captures forces due to wind current through measured velocities; $v_a$ measured air current velocities; $v_w$ measured wind current velocities; and the last term on the right-hand side of equation (1) denotes the Coreolis force due to rotation of the earth. The vector $\hat{k}$ in this term should be interpreted as a unit vector pointing down towards the interior of the earth and f≡2ω sin Ø, where ω denotes the Earth's angular velocity and Ø denotes the latitude of the ice floe. Khandekar (1980) gives a similar equation for forecasting. Sayed and Timco (2009) formulate a method for solving equation 1 for ice floe velocity. For FIGS. 2A and 2B trajectory computations, wind velocities $v_a$ were ingested hourly and time registered with SAR imagery into the data stream.

Figure 3A:
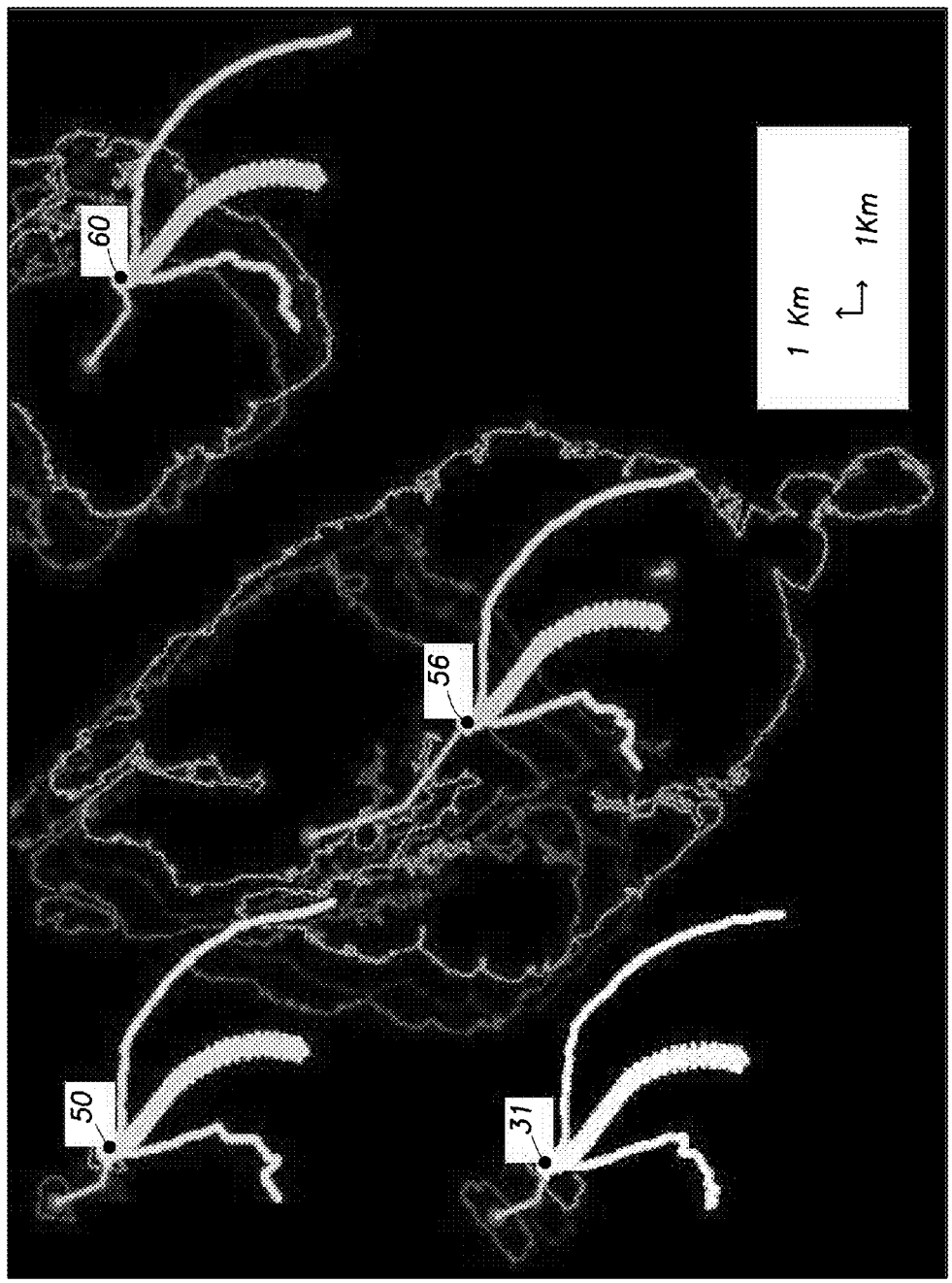
FIG. 3A is a schematic depiction of two-day ice floe trajectory forecasts and uncertainty cones beyond the latest positions in FIG. 1, in accord with the present invention.
Figure 3B:
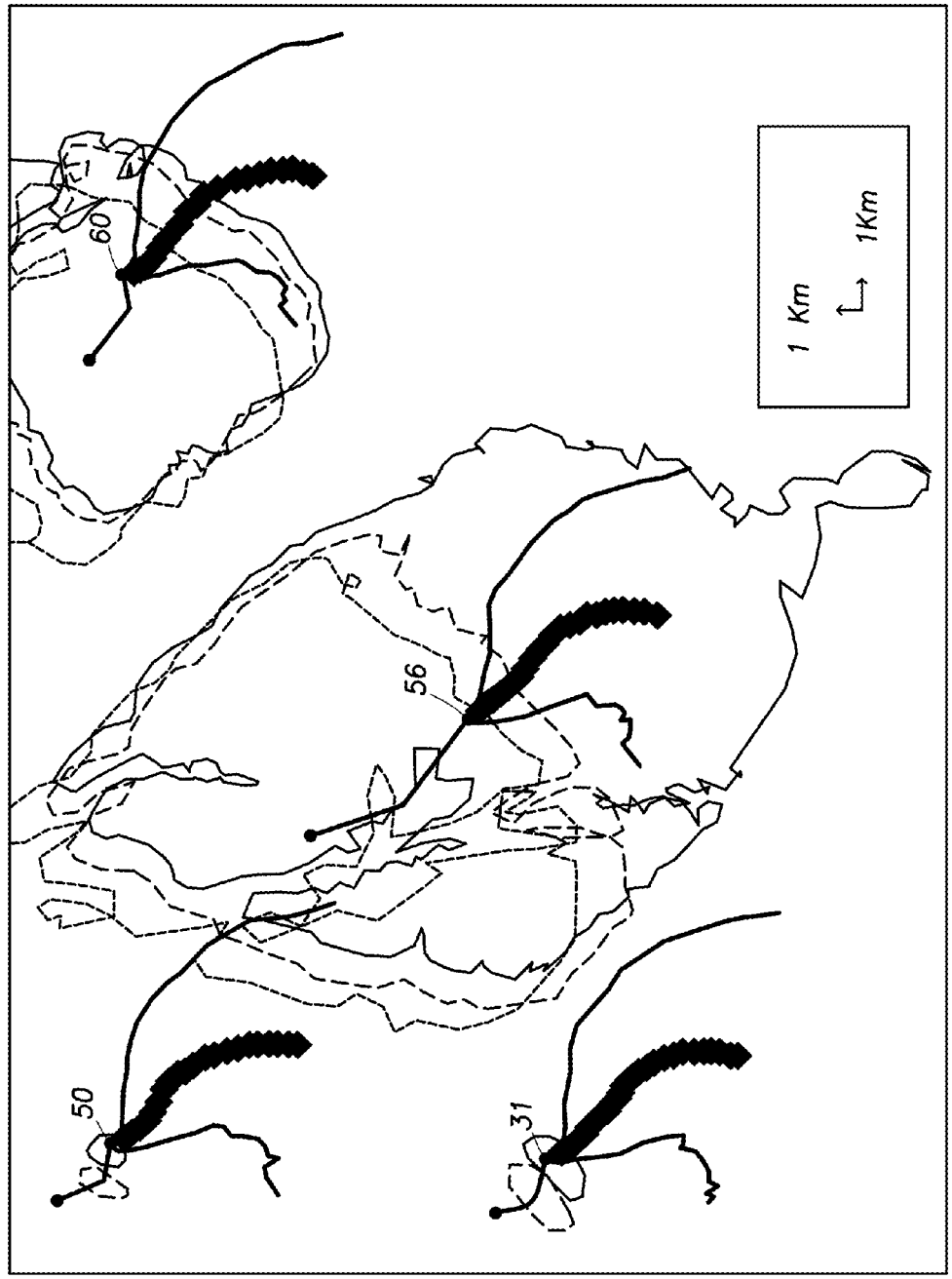
FIG. 3B is a more detailed schematic depiction of FIG. 3A.

Differences between forecasted positions from equation 1 and observed positions can readily be measured and accumulated over time to define an up-to-date cone of uncertainty along each predicted floe trajectory. FIGS. 3A and 3B displays an uncertainty cone (31, 50, 56, 60), under the assumption of Gaussian position errors, centered around a two-day trajectory forecast for each of the example floes. This direct estimation of uncertainty characterizes the total error of the forecast, without attempting to break it into its constituent components—data errors, approximations in the physical model, etc. Blunt, Mitchell et al. (2012) describe an uncertainty characterization in terms of constituent components.

This invention accommodates any chosen combination of tracking data including satellite imagery, optical imagery, radar, GPS, etc., as well as any chosen combination of metocean data. It also accommodates any chosen, quantitative methods for processing the data for ice floe tracking, forecasting, and uncertainty quantification.

Synthetic Aperture Radar (SAR) imagery is preferred over optical imagery for tracking, given that SAR is effective at night as well as with cloud cover.

Others have developed independent methods for detecting and characterizing ice floes from satellite imagery (Blunt, Kumaran et al., 2012), tracking ice floes from one image to the next (Hall et al., 2010), and forecasting ice floe trajectories with an estimate of uncertainty (Blunt, Mitchell et al., 2012). Applied as independent, isolated methods with independent data, ice floe tracking cannot be integrated with forecasting and sustained in near real time. However, this invention describes a computational workflow which automatically ingests, integrates, and applies this entire collection of methods and data to enable ongoing and integrated tracking and forecasting of ice floes.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

1. Anno, P., Soofi, K., Cobb, B., Santosuosso, J., Yetsko, C., and Glover, D., 2012, Near-Real-Time Tracking and Integrated Forecasting of Arctic Ice Floes: Proceedings of the Arctic Technology Conference, 3-5 Dec. 2012, Houston, Tex., OTC 23839.
2. Blunt, J., Kumaran, K., Garras Yanni, V., Matskevitch, D., Hamilton, J., 2012, Image Analysis Techniques for High Arctic, Deepwater Operation Support: Proceedings of the Arctic Technology Conference, 3-5 Dec. 2012, Houston, Tex., OTC 23825.
3. Blunt, J., Mitchell, D., Matskevitch, D., Younan, A., Hamilton, J., 2012, Tactical Sea Ice Drift Forecasting for Summer Operation Support in the Canadian Beaufort Sea: Proceedings of the Arctic Technology Conference, 3-5 Dec. 2012, Houston, Tex., OTC 23824.
4. Hall, J., Bigg, G., and Hall, R., 2010, Identification and tracking of ice objects in the Fram Strait using the ITSARI algorithm: Proceedings of the ESA Living Planet Symposium, 28 Jun.-2 Jul. 2010, Bergen, Norway, ESA SP-686.
5. Izenman, A., 2008, Modern multivariate statistical techniques: Springer.
6. Khandekar, M., 1980, Inertial oscillations in floe motion over the Beaufort Sea—observations and analysis: Atmosphere-Ocean, 18:1, 1-14
7. Otsu, N., 1979, A threshold selection method from gray-level histograms: IEEE Transactions on Systems, Man and Cybernetics, vol. 9, no. 1, pp. 62-66.
8. Sayed, M. and Timco, G., 2009, A numerical model of iceberg scour: Cold Regions Science and Technology, 55, 103-110.

The invention claimed is:

1. A method for tracking and forecasting a marine ice body comprising:
   a. capturing an image and metocean data of an area of interest with a synthetic aperture radar (SAR), wherein the image includes a plurality of pixels;
   b. detecting any marine ice bodies in the area of interest with the synthetic aperture radar (SAR);
   c. classifying the plurality of pixels in the image to define a shape and position of the marine ice body;
   d. repeating steps (a)-(c) at least once to obtain an additional image;
   e. comparing sequential images, wherein a background trend for motion between images and a shape characteristic are utilized to compare the sequential images, wherein the background trend is determined by establishing a correlation between the sequential images, wherein an ITSARI algorithm is utilized to determine the shape characteristic of the marine ice body;
   f. solving a trajectory of each ice floe beyond its current position, wherein the metocean data is utilized to solve the trajectory for each of the marine ice bodies beyond its current position; and
   g. updating Gaussian uncertainty parameters with cumulative observations of error from incoming SAR to provide a cone of uncertainty for the forecasted trajectory.

2. A method for tracking and forecasting a marine ice body comprising:
   a. capturing an image and metocean data of an area of interest with any type of satellite imagery, wherein the image includes a plurality of pixels;
   b. detecting any marine ice bodies in the area of interest with the satellite imagery;
   c. classifying the plurality of pixels in the image to define a shape and position of the marine ice body;
   d. repeating steps (a)-(c) at least once to obtain an additional image;
   e. comparing sequential images, wherein a background trend for motion between images and a shape characteristic are utilized to compare the sequential images, wherein the background trend is determined by establishing a correlation between the sequential images, wherein a tracking algorithm is utilized to determine the shape characteristic;
   f. solving a trajectory of each marine ice body beyond its current position, wherein the metocean data is utilized to solve the trajectory for each marine ice body beyond its current position; and
   g. applying an uncertainty model for uncertainty in the trajectory forecast.

3. The method according to claim 2, wherein the satellite imagery is synthetic aperture radar (SAR).

4. The method according to claim 2, wherein the satellite imagery is optical imagery.

5. The method according to claim 2, wherein the tracking algorithm is the ITSARI algorithm.

6. The method according to claim 2, wherein a Gaussian model for uncertainty of the forecast is incorporated through cumulative observations of error from incoming satellite imagery to provide a cone of uncertainty for the forecasted trajectory.

\* \* \* \* \*